United States Patent [19]

Sullivan

[11] Patent Number: 5,227,032
[45] Date of Patent: Jul. 13, 1993

[54] METHOD FOR PRODUCING OXYGEN FROM LUNAR MATERIALS

[75] Inventor: Thomas A. Sullivan, Houston, Tex.

[73] Assignee: The United State of America as represented by the Administrator of the National Aeronautics and Space Administration, Washington, D.C.

[21] Appl. No.: 764,581

[22] Filed: Sep. 24, 1991

[51] Int. Cl.[5] .......................... C25B 1/02; C25B 1/22; C25C 1/06
[52] U.S. Cl. .............................. 204/129; 204/105 R; 204/112; 204/104
[58] Field of Search ................. 204/129, 112, 105 R, 204/108; 423/74, 152, 558, 69, 82, 83, 85, 86, 558, 146, 150

[56] References Cited

U.S. PATENT DOCUMENTS

| | | | |
|---|---|---|---|
| 3,529,957 | 9/1970 | Kunda et al. | 423/146 |
| 3,533,742 | 10/1970 | Oster | 423/146 |
| 3,773,913 | 11/1973 | Downs | 423/579 |
| 3,865,703 | 2/1975 | Schenker | 204/105 R |
| 3,888,750 | 6/1975 | Brecher et al. | 204/129 |
| 4,053,573 | 10/1977 | Harrer | 423/540 |
| 4,082,832 | 4/1978 | Watanabe et al. | 423/70 |
| 4,206,021 | 6/1980 | Rivory | 204/96 |
| 4,440,734 | 4/1984 | Kougioumoutzakis | 423/549 |
| 4,663,131 | 5/1987 | Gerken et al. | 423/82 |
| 4,919,772 | 4/1990 | Bachot | 204/96 |
| 4,997,533 | 3/1991 | Kawatra et al. | 204/113 |

OTHER PUBLICATIONS

Hackh's Chemical Dictionary, 4th ed, McGraw Hill, 1969, p. 222 "distillation".
Electrometallurgy, Encyclopedia of Chemical Technology, 3d Ed. vol. 9, pp. 759-764 (1980).
"Process Engineering Concerns in the Lunar Environment," delivered on Sep. 27, 1990 at the AIAA Conference, Space Programs and Technology Conference, Sep. 25, 1990 through Sep. 27, 1990, T. A. Sullivan, pp. 1-9.

Primary Examiner—John Niebling
Assistant Examiner—Kathryn Gorgos
Attorney, Agent, or Firm—Russell E. Schlorff; Guy M. Miller; Edward K. Fein

[57] ABSTRACT

Methods for producing oxygen from metal oxides bearing minerals, e.g. ilmenite, the process including producing a slurry of the minerals and hot sulfuric acid, the acid and minerals reacting to form sulfates of the metal, adding water to the slurry to dissolve the minerals into an aqueous solution, separating the first aqueous solution from unreacted minerals from the slurry, and electrolyzing the aqueous solution to produce the metal and oxygen; and in one aspect, a process for producing a slurry with ferrous sulfate therein by reacting ilmenite and hot sulfuric acid, adding water to the slurry to dissolve the ferrous sulfate into an aqueous solution, separating the aqueous solution from the slurry, and electrolyzing the aqueous solution to produce iron and oxygen. In one aspect, these process are suitable for producing oxygen in outer space, e.g. on the moon or Mars.

8 Claims, 3 Drawing Sheets

High Concentration, Fast Rate Sulfate Process

Two-Pot Modified Sulfate Process
and energy recovery

Two Pot process with recirculation around
dissolution and electrolysis steps.

METHOD FOR PRODUCING OXYGEN FROM LUNAR MATERIALS

ORIGIN OF THE INVENTION

The invention described herein was made by an employee of the United States Government and may be manufactured and used by or for the Government of the United States of America for governmental purposes without the payment of any royalties thereon or therefor.

BACKGROUND OF THE INVENTION

1. Field Of The Invention

This invention is related to producing oxygen and to producing oxygen from lunar or martian materials; in one aspect to producing oxygen on the moon; and in another aspect to such a process in which oxygen is produced from lunar ilmenite in which sulfuric acid is recycled and titanium dioxide and iron are produced as by-products.

2. Description Of Related Art

There are many methods for producing oxygen from oxygen bearing minerals, a few of which use the mineral ilmenite as the feedstock. These tend to use extremes of temperature or of other processing parameters. One of the most common processes, the hydrogen reduction of ilmenite, is done at a relatively high temperature and results in high power consumption.

While the prior art teaches how to carry out many of the individual steps disclosed in this invention, many prior art processes are not concerned with producing oxygen and do not provide any motivation to make the combination claimed herein.

One existing commercial process, the "sulfate process", for producing titanium dioxide ($TiO_2$) from ilmenite utilizes sulfuric acid. The ilmenite is digested with concentrated acid to produce a porous cake consisting of ferrous and titanium sulfates. This mixture is dissolved in water, cooled to crystallize out and filter $FeSO_4 \cdot 7H_2O$, and then heated to convert the hydrolytically unstable $TiOSO_4$ to $TiO_2$. For this process to occur rapidly, there is a limit on the amount of excess sulfuric acid. Practically, this requires a high concentration of sulfuric acid in the digestion step. Since $TiO_2$ product is to be used as a white pigment, efforts are made to prevent any colored ferric ion from forming. The calcining of the final $TiO_2$ is done at 900–950 degrees Centigrade under controlled conditions (and at one atmosphere pressure) since its crystalline form is important.

In another existing process, "electrolytic iron" is produced by reduction of $FeSO_4 \cdot 7H_2O$. This material is also used quite often in electroplating of objects with iron at the cathode. Oxygen is released and allowed to escape at the anode.

Sulfuric acid has been a commodity chemical for decades. Perennially, it is the largest volume chemical produced in the world. The economy of most major countries can be judged by its sulfuric acid consumption. There is an enormous amount of knowledge in the prior art on its manufacture, recovery, purification, and handling.

U.S. Pat. No. 3,773,913 discloses a process directed specifically to the production of oxygen on the moon using lunar materials. Lunar soil, known as regolith, is collected and separated. Ilmenite is then separated out as the material of choice. An electrolysis step is then performed. Fluorine is used as the first chemical reaction step, producing a variety of metal fluorides and releasing oxygen gas directly. This process is based on standard geochemical analytical chemistry in which fluorine or hydrofluoric acid is used to completely digest the sample. Potassium vapor and an electrolysis recovery step that do not release oxygen are involved.

U.S. Pat. No. 3,888,750 discloses that there are two basic methods used in the production of oxygen. The first is the separation of water into its constituent components. The second is the use of a membrane to separate oxygen from other atmospheric gases. This should be expected for earthly uses, since water is abundant and easily converted. This process is aimed at the production of hydrogen, which is released during an electrolysis of sulfurous acid, not sulfuric acid. No oxygen is released in this step. Sulfuric acid is made due to the oxidation of the sulfurous acid, which is then taken to a separate, thermochemical step to release oxygen by high temperature decomposition.

U.S. Pat. No. 4,053,573 discloses the recovery and reuse of the sulfuric acid in an energy efficient manner. A heating and cooling cycle is introduced which varies in temperature from 160° C.–250° C. The lower operating temperatures account for the energy savings.

U.S. Pat. No. 4,082,832 discloses a process for the recovery of sulfuric acid, $H_2SO_4$, in the production of titanium dioxide, $TiO_2$, from the raw material ilmenite. This patent describes the reduction of energy consumed in the concentration process of the acid recovery by pretreating the waste acid. $FeSO_4 \cdot nH_2O$, (a by-product of the pretreatment process) is dissolved in water or acids. The process is repeated several times increasing the sulfuric acid content on each successive cycle. The energy input is low for this procedure. This process is an improvement upon the existing sulfate route to titanium dioxide aimed at recycling sulfuric acid and recovering trace metals. This process isolates ferrous sulfate which then undergoes a series of oxidations (with $Cl_2$ gas or air) and reductions, resulting in iron oxides or hydroxides as the final product. Oxygen production is not an object of this process.

U.S. Pat. No. 4,440,734 discloses a process for the recovery of sulfuric acid which requires significantly less energy than conventional processes. It is directed to the $TiO_2$ pigment production industry. A liquid/liquid process is employed to separate the vanadium, iron, titanium, aluminum and chromium impurities from the dilute sulfuric acid. This is accomplished at room temperature as compared with the known prior art high temperature decomposition process (1,000° C.). In the disclosed process spent sulfuric acid is recovered via a liquid/liquid extraction technique.

U.S. Pat. No. 4,663,131 discloses $TiO_2$ production by using $H_2SO_4$ to digest Ti containing material to form a cake that is easily soluble. Ilmenite is used as the raw material. An object of the invention concerns the recovery of $H_2SO_4$ and another is the modification of the process allowing the use of $H_2SO_4$ at a much lower concentration (75%). This process improvement to the existing sulfate route to titanium dioxide aims at reducing the volume of waste sulfate and sulfuric acid streams, thus reducing pollution. It also lowers the cost of the existing process due to this improvement and the ability to recycle some of the intermediate. The process is not concerned with producing oxygen by the electrolysis of the ferrous sulfate made as a by-product.

By-product ferrous sulfate is used to lower the strength of the sulfuric acid required for use in the batch process.

U.S. Pat. No. 4,997,533 specifies hydrochloric acid as the medium for carrying out its process to produce oxygen. Chlorine can be and is released upon electrolysis of the chloride solution.

There has long been a need for an efficient and effective process for producing oxygen in outer space, e.g. from lunar materials on the moon. There has long been a need for such a process which can be practiced on the moon. There has long been a need for such a process whose power requirements can be met in a lunar environment.

SUMMARY OF THE PRESENT INVENTION

The present invention, in one embodiment, discloses a process for producing oxygen in outer space (e.g. on the moon or on Mars) in which metal oxide bearing minerals are reacted with hot sulfuric acid to produce a porous cake of metal sulfates. A slurry is formed by the addition of water to dissolve the soluble sulfates. The slurry is then clarified to remove unwanted insoluble materials, and cooled to crystallize out and filter metal sulfate, an aqueous solution of which is then electrolyzed to produce oxygen and metal.

In another embodiment of the invention, some of the metal sulfate is hydrolyzed and then filtered, producing metal dioxide and sulfuric acid which is then distilled, producing sulfuric acid of higher concentration which may be recycled to the original reaction step. The distillation also produces some water which can be recycled to the original reaction step.

In another embodiment, the present invention teaches a process for the production of oxygen from metal oxide bearing minerals, the process including producing a slurry of the minerals and hot sulfuric acid, the acid and minerals reacting to form sulfates of the metal, adding the water to the slurry to dissolve the sulfates into an aqueous solution, separating the first aqueous solution from unreacted solids and electrolyzing the aqueous solution to produce the metal and oxygen.

In another embodiment of the present invention, a process for the production of oxygen from ilmenite includes producing a slurry of the ilmenite and hot sulfuric acid which react to form ferrous sulfate, adding water to the slurry to dissolve the ferrous sulfate into an aqueous solution, separating the aqueous solution from the slurry, and electrolyzing the aqueous solution to produce iron and oxygen.

In a particular embodiment of a process according to the present invention, an ilmenite bearing feedstock is reacted ("digested") with water and hot sulfuric acid, preferably at a high concentration. The resulting mixture, a porous cake or slurry with ferrous and titanium sulfates, sulfuric acid, and some water is dissolved in additional water; clarified to remove unwanted unreacted solids ("gangue") containing metal silicates and some metal sulfates; cooled to crystallize out ferrous sulfate (which is then filtered), with the remainder of the mixture hydrolyzed to produce titanium dioxide and sulfuric acid.

The titanium dioxide bearing slurry is filtered using a conventional solid/liquid separator producing titanium dioxide and a filtrate containing water and sulfuric acid.

An aqueous solution with ferrous sulfate (resulting from the cooling, crystallization, and filtration) is fed to an electrolyzer which produces three primary outputs: 1. iron; 2. oxygen; and 3. a liquid stream containing water and sulfuric acid and, in some instances, a small amount of ferrous sulfate in solution that was not electrolyzed. This liquid stream is fed to a distillation device along with the filtrate stream from the filtration step. The distillation produces two streams: 1. a water vapor stream with trace sulfuric acid; and 2. a concentrated liquid sulfuric acid stream. The first stream with the water vapor is recycled to the dissolution step. The second stream with concentrated sulfuric acid is recycled to the initial digestion step.

Calcining (heating) of unreacted solids produced by the filtration and clarification steps yields titanium dioxide, usable water vapor, sulfur dioxide and sulfur trioxide, all of which may be recycled back into the primary process as a sulfuric acid solution.

Oxygen produced by this process may be stored in gaseous form as it is produced or it may be liquefied for storage.

In the original reaction step (called a "digestion"), sulfuric acid reacts with a metal oxide material; e.g. (M=metal).

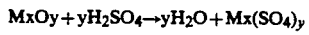

$$M_xO_y + yH_2SO_4 \rightarrow yH_2O + M_x(SO_4)_y$$

For the iron oxide bearing mineral, ilmenite of this equation is

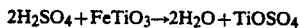

$$2H_2SO_4 + FeTiO_3 \rightarrow 2H_2O + TiOSO_4$$

In a hydrolyzing step, the $TiOSO_4$ (titanium sulfate) is converted to titanium dioxide and sulfuric acid:

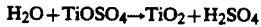

$$H_2O + TiOSO_4 \rightarrow TiO_2 + H_2SO_4$$

Alternatively, the titanium sulfate can be pyrolyzed to release its sulfur values for recycle:

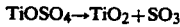

$$TiOSO_4 \rightarrow TiO_2 + SO_3$$

In the electrolysis step, oxygen is released; e.g. with a feed containing ilmenite; the produced ferrous sulfate with water is electrolyzed, and the reaction is represented by

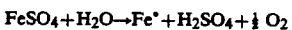

$$FeSO_4 + H_2O \rightarrow Fe^* + H_2SO_4 + \tfrac{1}{2} O_2$$

The $TiO_2$ which leaves the process may be calcined to prevent loss of water on the filter cake, but perhaps not under the rigid control necessary for use as a pigment. Moderate heating under low pressure may minimize the energy required. Any other sulfates ($CaSO_4$, $MgSO_4$, $Na_2SO_4$, $K_2SO_4$) may be treated to recover their sulfuric acid value, as well. There is existing prior art technology to accomplish this.

Energy enters this embodiment of the process in two major steps: first in the electrolysis of $FeSO_4 + H_2O$ to $Fe + O + H_2SO_4$ and, secondly, in the distillation at the end of the process. Removal of water from $H_2SO_4$ solutions is very endothermic and, in a sense, provides the driving force for the rest of the process. Thus, a large part of the energy is, preferably, put into the process in a separation step as heat rather than in a true chemical step.

A process according to this invention for practice on the moon or on Mars can take advantage of the ease of manufacture of sulfuric acid to provide safety in the launch and set-up of the plant. Sulfur, water, and oxygen would be launched. The sulfur is burned to $SO_2$, further oxidized over a catalyst (e.g. vanadium oxide) to SO$_3$, and dissolved in water to provide the sulfuric acid for the process. This need not be a large unit, it could take several days to make the few gallons required. Since iron sulfide is available on the moon, it is possible to manufacture make-up acid at the plant from lunar materials using much of the same equipment. Recovery of the acid value from the minor sulfates mentioned above also uses this equipment (e.g. gases leaving the calciner can be recycled back to sulfuric acid in this unit). In any case, with water (or hydrogen) and sulfur, acid can be made in the plant, relieving shipping and handling concerns.

The reaction of ilmenite and sulfuric acid generally is done at less than 200 degrees centigrade. The filtration of FeSO$_4$·7H$_2$O is done at about 10 degrees centigrade. Electrolysis is generally done at ambient conditions to slightly warm, perhaps due to convenience. The recovery of concentrated sulfuric acid from dilute streams by distillation requires temperatures reaching 300 degrees centigrade. Much of this heat may be "recovered" by adding the hot acid to the front end of the process. The resulting hot water condensate would preferably be used to dissolve the sulfate porous cake. Calcining the waste TiO$_2$ may require elevated temperatures, depending on the pressure. In outer space (e.g. on the moon or on Mars), lower pressures than are economical for a commercial process here on earth may be used.

In one embodiment, the FeSO$_4$ may be electrolyzed without isolation under acidic conditions; however, the volume would need to be increased to lower this acid concentration to an acceptable range. This would simplify the process greatly, though, and remove the need for cooling 10 degrees centigrade. Power would be saved and the need for thermal radiators eliminated.

In another embodiment, some oxygen is released from TiOSO$_4$ by electrolysis before it hydrolyses. Since there is a family of "suboxides" of titanium, some of the oxygen can be released, producing, TiO, Ti$_2$O, Ti$_2$O$_3$, or the like. This would increase the yield of the process enormously. TiO$_2$ can be electrolyzed in molten salts to provide Ti metal and O$_2$. After the calcining of TiO$_2$ "waste" required to close the water and sulfuric acid balance around the process, there is only a minor effect to drop this heated TiO$_2$ into a molten salt bath to recover twice again as much oxygen as from the FeO component, and titanium metal as a bonus.

In another embodiment of the invention, the two major process drivers, digestion and dissolution, are accomplished in two separate vessels. This gains the advantage of high acid concentration and reaction temperature for speed of digestion in the digester D, and high solubility of the sulfates by use of lower acid concentration in the reactor R, by continuously distilling water vapor out of the first vessel into the second vessel. In such a process, the titanium sulfate hydrolyzes only slowly due to the acid content in the reactor R. Therefore, it attains its maximum solubility after several recycles. Thereafter, a steady state amount of titanium sulfate leaves the process with the gangue in the clarification step. Calcination returns its sulfur value to the process.

It is, therefore, an object of the present invention to provide new, useful, unique, efficient, and effective methods for producing oxygen from metal oxide bearing materials.

Another object of at least certain preferred embodiments of the present invention is the provision of such methods which can be effectively practiced in outer space, e.g. on Mars or on the moon with lunar materials.

Yet another object of the present invention is the provision of such methods for which necessary materials in a safe form can be launched from the earth to the production site.

A further object of at least certain preferred embodiments of the present invention is to provide such methods in which digestion and dissolution steps occur separately, allowing greater process flexibility and control.

An additional object of at least certain preferred embodiments of the present invention is the provision of such methods in which products and/or by products may be recycled for use in these or other methods.

The present invention recognizes and addresses the previously-mentioned long-felt needs and provides a satisfactory meeting of those needs in its various possible embodiments. To one of skill in this art who has the benefits of this invention's teachings and disclosures, other and further objects and advantages will be clear, as well as others inherent therein, from the following description of presently-preferred embodiments, given for the purpose of disclosure, when taken in conjunction with the accompanying drawings. Although these descriptions are detailed to insure adequacy and aid understanding, this is not intended to prejudice that purpose of a patent which is to claim an invention no matter how others may later disguise it by variations in form or additions of further improvements.

DESCRIPTION OF THE DRAWINGS

So that the manner in which the above-recited features, advantages and objects of the invention, as well as others which will become clear, are attained and can be understood in detail, more particular description of the invention briefly summarized above may be had by reference to certain embodiments thereof which are illustrated in the appended drawings, which drawings form a part of this specification. It is to be noted, however, that the appended drawings illustrate preferred embodiments of the invention and are therefore not to be considered limiting of its scope, for the invention may admit to other equally effective equivalent embodiments.

DESCRIPTION OF EMBODIMENTS PREFERRED AT THE TIME OF FILING FOR THIS PATENT

Figure 1:
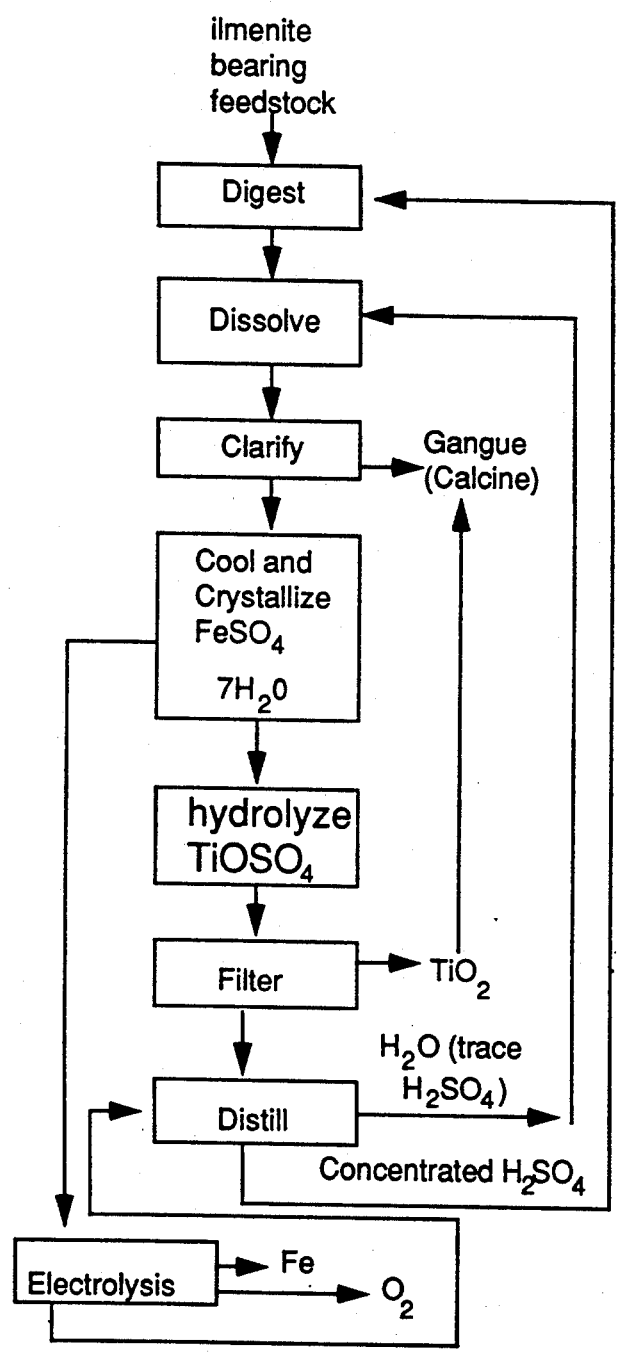
FIG. 1 is a schematic view of a process according to the present invention.

A process according to the present invention as described schematically in FIG. 1 begins with the introduction of an ilmenite bearing feedstock to a digester in which the feedstock is reacted with water and hot concentrated sulfuric acid (e.g. at about 160 to about 200 degrees Centigrade). The resulting mixture, a porous cake or slurry with ferrous and titanium sulfates, sulfuric acid, and water is dissolved in additional water;

clarified to remove unwanted unreacted solids ("gangue"); cooled to crystallized out ferrous sulfate; with the remainder of the mixture hydrolyzed by boiling to produce titanium dioxide and sulfuric acid.

The titanium dioxide bearing slurry is filtered producing titanium dioxide wet cake and a filtrate of dilute sulfuric acid.

The ferrous sulfate is fed as an aqueous solution to an electrolyzer which produces three primary outputs: 1. iron; 2. oxygen; and 3. a liquid stream containing water and sulfuric acid. This liquid stream is fed to a distillation device along with the filtrate stream from the filtration step. The distillation produces two streams: 1. a water vapor stream with trace sulfuric acid; and 2. a concentrated liquid sulfuric acid stream. The first stream with the water vapor is recycled to the dissolution step. The second stream with concentrated sulfuric acid is recycled to the initial digestion step.

Calcining (heating) of unreacted solids (gangue and titanium dioxide wet cake produced by the filtration step) yields titanium dioxide, usable water vapor, and sulfur oxides which then form sulfuric acid, which may be recycled back into the primary process. The hot solids, including metal oxides and metal silicates, are treated as waste, but may be a feedstock for other processes in outer space, e.g. on the Moon.

Figure 2:
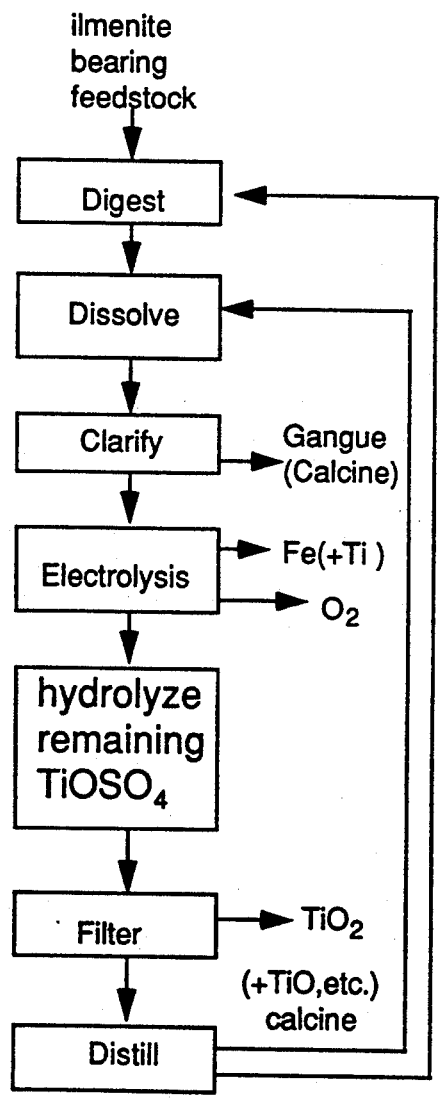
FIG. 2 is a schematic view of a process according to the present invention.

In the process shown in FIG. 2 the electrolysis step is "in-line" with the other steps. The liquid from the clarification step, containing ferrous sulfate and titanium sulfate, goes to the electrolyzer. Iron and oxygen are produced in the electrolyzer. Titanium sulfate remains largely unreduced and continues forward to be hydrolyzed and processed as in the process of FIG. 1. This process eliminates the need (as in the process of FIG. 1) to cool down a hot solution, e.g. to about 10 degrees centigrade, to isolate ferrous sulfate.

The electrolyzer of FIG. 2 will operate with a higher concentration of sulfuric acid than that in FIG. 1 (e.g. about 40 to about 90% as compared to about 1 to about 20%). Optionally, oxygen is recoverable from the titanium oxides resulting from the filtration step; e.g. titanium dioxide can be electrolyzed in molten salts to produce titanium and oxygen. The steps in the process of FIG. 2 with labels as shown in FIG. 1 are similar to those steps in FIG. 1.

Figure 3:
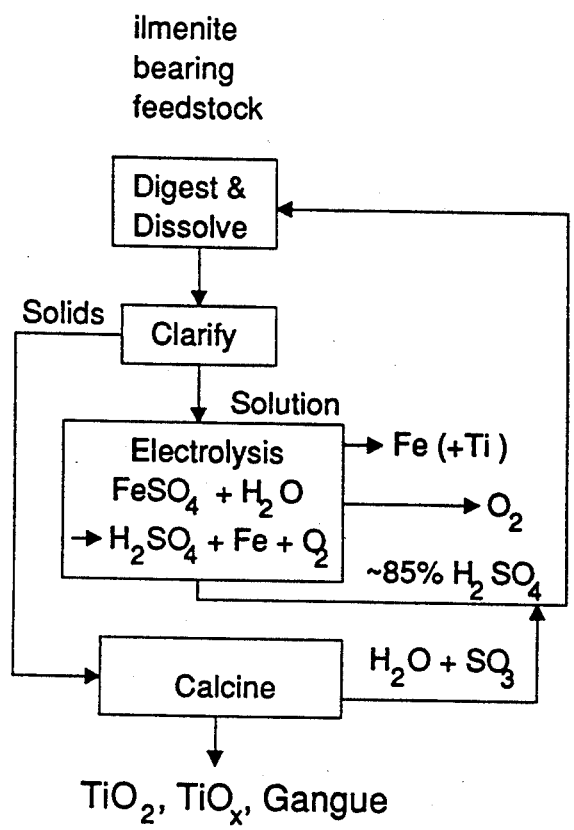
FIG. 3 is a schematic view of a process according to the present invention.

A process according to the present invention as shown in FIG. 3 is like the processes of FIGS. 1 and 2, but the digestion and dissolving steps occur concurrently in one vessel. Undesired solids from a clarification step are heated ("calcined"), producing recyclable water and sulfur oxides which join a liquid stream from the electrolyzer containing about 85% sulfuric acid, water, and soluble sulfates, which is then recycled to the digestion/dissolving vessel. Solids, including gangue, titanium sulfate, titanium dioxide, and other titanium oxides also exit the heating step.

Based on published solubilities of $FeSO_4$ in various strength $H_2SO_4$ solutions, the process is operated at concentrations such that the $FeSO_4$ produced by ilmenite digestion is at or slightly below its maximum solubility at the operating temperature. In this regard, an $H_2SO_4$ concentration (e.g. wt. 85%) is chosen that allows the digestion to proceed at an adequate speed. There is a 1:1 molar ratio of $H_2SO_4$ to $H_2O$ (with a weight ratio of 84.5:15.5) to a local maximum solubility of ferrous sulfate. The process is run as hot as practicable (e.g. about 160 to 220 degrees Centigrade) so as to speed the reaction rate and increase the concentration for the sake of efficiency within the bounds of corrosion and pressure. In another preferred embodiment the process is run continuously at about 200 degrees centigrade using steady state concentrations of sulfuric acid and water at a 1:1 molar ratio, i.e. 84.5:15.5% excluding the dissolved solids. The vapor pressure of this solution is in the range Of 300 mm Hg, allowing for light weight construction of the pressure vessel for lunar operations. Reflux control of the temperature operated at a given pressure, or temperature control of the pressure with no intentional condensing, are reasonable operational guidelines. Any non-reacting feed (consisting mostly of silicates on the moon) would most likely remain undissolved and would be removed from the process as gangue, e.g. by the continuous solid/liquid separation (clarification) before the electrolysis operation. The filtrate passing this step thus contains dissolved sulfate salts and is electrolyzed to release oxygen directly from the hot solution. Iron and perhaps some titanium are formed at the cathode. The sulfuric acid regenerated in this step goes directly back to the digestion step. Alternatively, some cooling may be needed after the solid/liquid separation and before the electrolysis for a variety of process engineering reasons.

The gangue removed in the clarification step would most likely contain some residual acid solution and some solid sulfate salts which would represent a loss to the process. This is recovered by heating the mass in the continuous calcination process to recover the sulfuric acid value as $SO_3$, $SO_2$, and $H_2O$. As titanium sulfate attains a steady state value at its solubility limit, a portion of it will leave the process with the gangue.

Low levels of potassium, sodium, magnesium, and calcium salts, originating from low amounts of their oxides in the feed, also exit the process with the gangue. Additional processing allows recovery of these materials as well, e.g. through sublimination from the calcining step.

Figure 4:
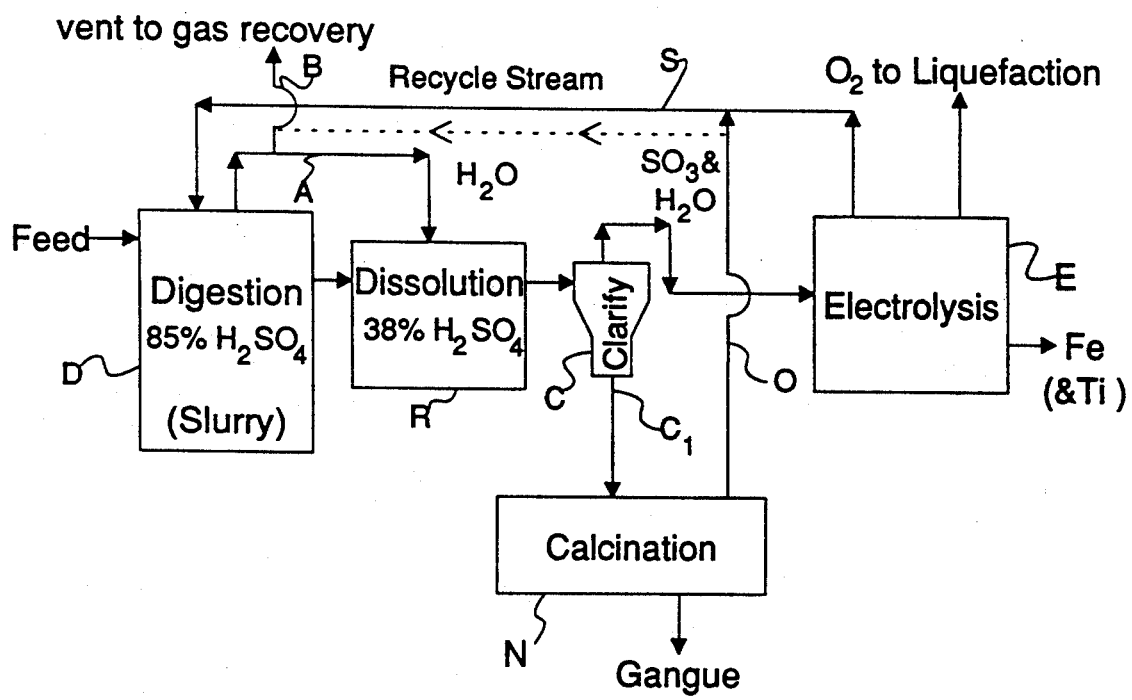
FIG. 4 is a schematic view of a process according to the present invention.

In the process shown in FIG. 4, ilmenite is fed into a digester D along with sulfuric acid. The resultant slurry is preferably by weight about 50% to about 85% sulfuric acid, about 50% to about 15% water, and about 1% to about 30% ilmenite. The feed ratio of ilmenite in this pot can be adjusted or optimized based on certain downstream parameters, e.g. slurry viscosity, boiling point, electrolysis conditions, heat exchanger fouling or filtration requirements. Upon heating, the reaction of these materials produces water, gangue, ferrous sulfate, and titanium sulfate. This slurry is fed to a second reactor R to which is added additional water which raises the water concentration to about 50% to about 90% to dissolve substantially all of the ferrous sulfate and preferably lower the sulfuric acid concentration to about 10 to about 50%. The ferrous sulfate and titanium sulfate concentration will depend on the feed ratio in the digestion step. The added water is, preferably, produced by continuous distillation (heating) in digester D, and flows in a flow line A from digester D to reactor R. The process can be operated at the lowest freezing point mixture of water and sulfuric acid, namely about 38% acid concentration, to avoid freezing up and plugging lines at lunar night temperatures. Importantly, the conductivity of aqueous sulfuric acid solutions also tends to reach a maximum in the range of 30% to 40% $H_2SO_4$. Dissolved salts can be expected to affect the conductivities somewhat as well as affect the freezing point of the mixture. The resultant slurry is fed to a clarifier C in which unreacted, insoluble, and undesirable materials (e.g. silicate minerals which were not digested in the sulfuric acid and other solids, such as undissolved titanium sulfate and other sulfates) are removed. Again, the lower concentration of acid improves this separation, relative to higher strength $H_2SO_4$, due to its lower viscosity, lower temperature (thus greater choice of materials of construction), and greater difference in density from the solids.

The resulting solution, containing sulfate salts, water, ferrous sulfate, sulfuric acid, and titanium sulfate, is fed to an electrolyzer E which produces oxygen, iron, and sulfuric acid—all formed during electrolysis—and allows unreacted material to be recycled back to the digester D. After leaving the electrolysis cell, the solution is recycled back to the digestion vessel. Since the concentration of water in this stream is greater than the composition desired in the digestion step, the heat input to this step is increased to distill water out of this vessel and over to the reactor R,, thus adding water to its contents as described previously. The extra power required to accomplish this is a potential negative to this modification of the process. Some of the heat will come from the exothermic nature of the reaction of the feedstock with the acid. Also, the resistance inherent in the electrolysis step will result in some temperature increase in the recycle stream. The heat so generated will be immediately utilized in the digestion step. The recycle stream S is a warm stream (warmed by heat from the reactor R and from the electrolysis) whose temperature is somewhat dependent on the concentration of sulfuric acid and the salts employed in the process, but which preferably ranges between about 25 to about 125 degrees Centigrade and provides some of the heat necessary to operate the digester D.

The solids from the clarifier C are fed via a line $C_1$ to a calcinator N in which they are heated to recover $H_2SO_4$ and $H_2O$ values. This calcination produces water vapor and gases such as sulfur dioxide, sulfur trioxide and oxygen for recycle. The gases are introduced via line O into the recycle stream S. Alternatively, the gases can go into line B and then to a gas recovery and recycle system as shown by the dashed line in FIG. 4. The solids, called "gangue", are primarily titanium dioxide and unreacted silicates. Optionally, this hot material can be formed or molded, e.g. into paving bricks or other structural items for building roads, landing pads, walls, slabs, etc. If necessary, an additional amount of heat may be added to the hot gangue to sinter the material. Introduction into the recycle stream S of the water vapor from the calcination step provides heat to the recycle stream. Temperature in the digester D typically ranges between about 115 and about 200 degrees Centigrade depending on the pressure and the concentrations of materials. Temperature in reactor R typically ranges between about 100 to about 150 degrees Centigrade. Electrolysis temperature typically ranges between about 25 to about 125 degrees Centigrade.

Another feature of this embodiment of the process is its improved operability. Since the solubility of $FeSO_4$ is quite sensitive to the acid concentration, reaching a sharp local maximum around 85% $H_2SO_4$, there is a need to precisely maintain this concentration for a process as depicted in FIG. 3. Drifting from that concentration could introduce process upsets due to the crystallization of dissolved salts. Process control is likely to be more forgiving given the extra control points available in the two-vessel process described herein. At lower acid strengths, the solubility of sulfate salts is much higher than at 85% $H_2SO_4$. One can operate safely below saturation of the desired sulfate salts and still have a high enough concentration to have good volume efficiency and electrolysis characteristics. Temperature control of boiling points control acid concentration in the first two vessels. Attempting to control the dissolved salt concentration would be more demanding, but possible.

The flexibility of this process, provided by separating the two major process drivers (digestion and dissolution), is an advantage to this particular process. The lower power requirements in the electrolysis step offset the greater power requirements in the front end of the process.

The process as shown in FIG. 4 gains the advantage of high acid concentration and reaction temperature for speed of digestion in the digester D, and high solubility of the sulfates by use of lower acid concentration in the reactor R by continuously distilling water vapor out of the first vessel into the second vessel. Both reactors would be under temperature control at the same pressure, e.g. about 5 to about 20 p.s.i. Electrolysis is done at the lower concentration (e.g. about 10 to about 50%, and preferably about 38% sulfuric acid) for a less demanding unit. The digester D has a slurry of both the desired products and gangue. After reaching the reactor R, additional water dissolves the most soluble species ($FeSO_4$ and $TiOSO_4$), leaving unreacted silicates behind. Vent gases consisting of any hydrogen sulfide produced in the process (e.g. from FeS in the lunar soil feedstock), along with solar-wind derived gases such as hydrogen, nitrogen and methane, and perhaps some oxygen driven out of solution by boiling action are vented through line B. Vented gas goes to a "flare" (not shown) to convert $H_2S$ to $H_2SO_4$ and $H_2$ to $H_2O$, and then to a gas recovery process. Gases from the calciner N can also be routed here.

Figure 5:
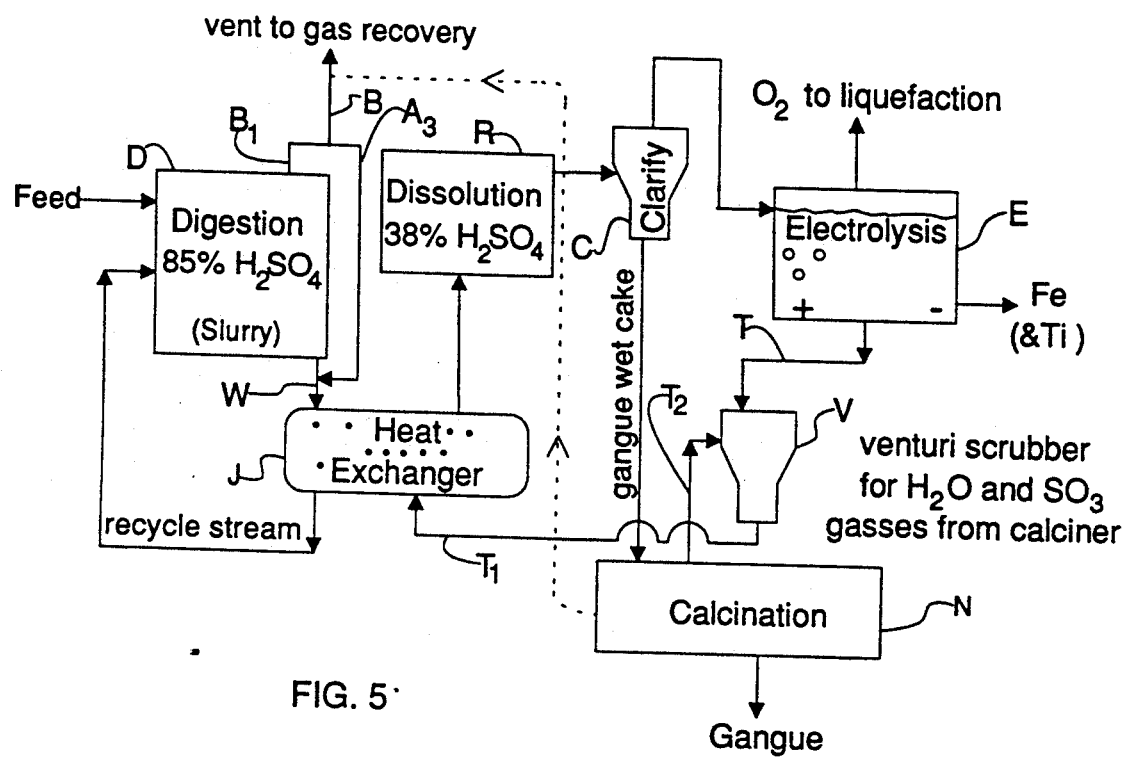
FIG. 5 is a schematic view of a process according to the present invention.

The continuous process shown in FIG. 5 is like that of FIG. 4, but a recycle stream from the electrolysis and calcination steps takes heat from the slurry fed from the digester D to the reactor R. A liquid recycle stream T, (with trace unreduced ferrous sulfate, water and sulfuric acid) flows through a heat exchanger J in countercurrent heat exchange relation to a slurry stream A, from the digester D. Water vapor is transferred via a line $A_3$ into a line W while unwanted gases (e.g. $H_2S$, $H_2$, $N_2$) are vented through a line B which is in fluid communication with a line $B_1$ from the digester D. Due to the lower concentration of sulfuric acid in the reactor R, the boiling point of the mixture in reactor R is lower (e.g. about 105 to about 130 degrees Centigrade) than that of material in digester D (e.g. about 160 to about 170 degrees Centigrade). Thus, needed heat is returned to the digester D.

In the process shown in FIG. 5, a liquid recycle stream T from the electrolyzer E is fed to an aspirator such as a venturi scrubber V to produce a suction to draw off certain desired gases in stream $T_2$ from the calcination step (e.g. water vapor, sulfur dioxide, sulfur trioxide and oxygen). The recycle stream $T_1$ thus contains all of these materials (and sulfuric acid). Recombination of the sulfur oxides with water occurring in the recycle stream will produce sulfuric acid. Alternatively, the gases in stream $T_2$ can be combined with stream B for gas recovery and recycle as shown by the dashed line in FIG. 5.

Figure 6:
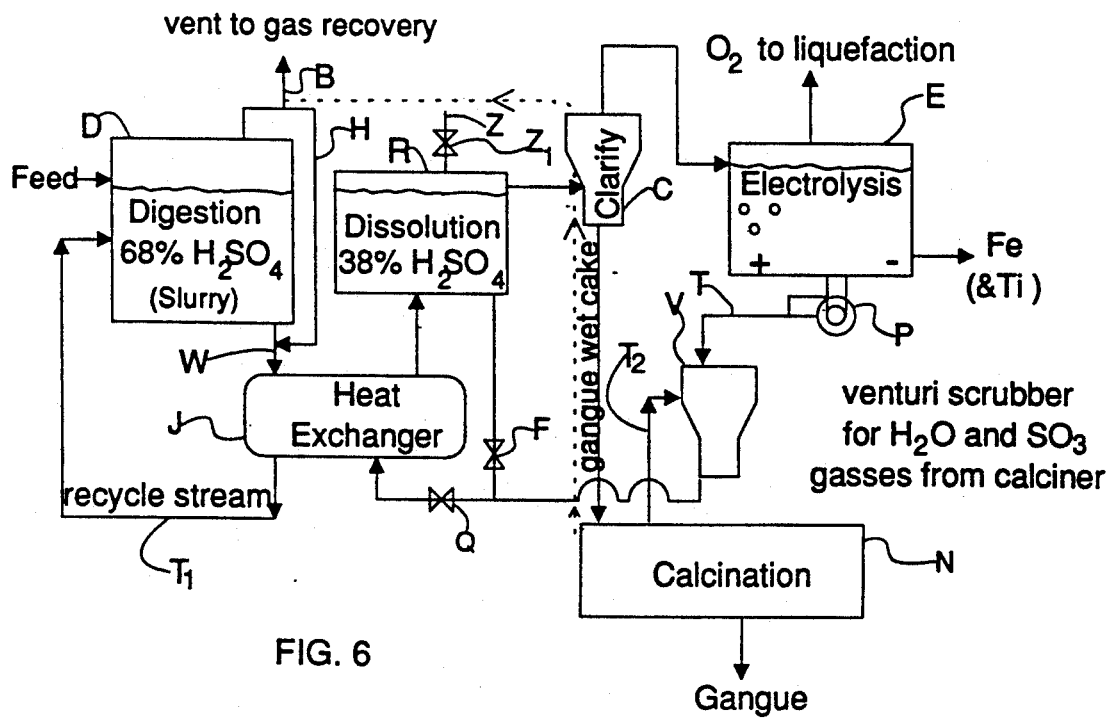
FIG. 6 is a schematic view of a process according to the present invention.

The continuous process according to the present invention shown in FIG. 6 is similar to the processes shown in FIGS. 4 and 5, but the concentration of sulfuric acid in the digester D is preferably about 68%. The boiling point of the mixture in digester D at this sulfuric acid concentration depends on the concentration of ilmenite fed to it, but typically is about 160 degrees Centigrade. Thus, the amount of water in digester D is about 32% by weight as compared to about 15% in the process shown in FIGS. 4 and 5. Therefore, there is much less of a demand for water to lower the sulfuric acid concentration in reactor R, i.e., less of a demand for water vapor from the digester D and thus less of a demand for power to heat digester D. Of course, the digestion rate for this process, although adequate, will be lower than that of the processes shown in FIGS. 4 and 5.

In the process shown in FIG. 6, if there are any volatile gases, produced in the digester D (e.g. hydrogen sulfide, hydrogen, methane), they escape through the vent line B. Water on the other hand, is returned via line H to an exit line W from the digester D. Vented gas containing hydrogen sulfide is processed further to produce useful sulfuric acid and/or water in a catalytic combustor or flare.

Another difference between the process shown in FIG. 6 and previously described processor is the use of a pump P to pump liquid (with ferrous sulfate) from the electrolyzer E through the venturi scrubber V. By operating the pump and valves F and Q, process flexibility is achieved. The stream of liquid from the electrolyzer (and entrained gases and water vapor from the calcination step) can be partitioned between the digester D and the reactor R, or all of the flow can be diverted to one of them. Gas may also be vented from the reactor R through a vent line Z when a valve Z, is opened. Also, as shown in FIGS. 4 and 5, gases vented from calcinator N can be routed to a general gas recovery and recycle system with the stream B as shown by the dashed line in FIG. 6.

This also means that flow through the heat exchanger J can be adjusted. By closing one valve or the other, the digester D or the reactor R can be run independently of the electrolyzer and the concentrations of ferrous sulfate in each may be different as desired. Since each of these items can be isolated, optimization of reactions therein can be done independently.

For example, the feed rate of ilmenite to the digester D will control the concentration in that vessel. The concentration of the solution in the reactor R is lowered by the addition of water to it (e.g. by distillation from the digester D) and also by recycling electrolyzed solution back to it (depleted by $FeSO_4$) via a stream in line T and valve F. Electrolysis conditions will determine the concentration of this stream.

In conclusion, therefore, it is seen that the present invention and the embodiments disclosed herein are well adapted to carry out the objectives and obtain the ends set forth at the outset. Certain changes can be made in the method and apparatus without departing from the spirit and the scope of this invention. For example, other metal oxide bearing materials which are useful as starting feedstock are iron silicates, such as olivine and pyroxene. It is realized that changes are possible and it is further intended that each element or step recited in any of the following claims is to be understood as referring to all equivalent elements or steps for accomplishing substantially the same results in substantially the same or equivalent manner. It is intended to cover the invention broadly in whatever form its principles may be utilized. The present invention is, therefore, well adapted to carry out the objects and obtain the ends and advantages mentioned, as well as others inherent therein.

What is claimed is:

1. A process for the production of oxygen on the moon from raw lunar soil containing metal oxide bearing minerals, the process comprising
   a. producing on the lunar surface an acidic slurry from the raw lunar soil, by reacting the metal oxide bearing minerals in the raw lunar soil with hot sulfuric acid, wherein the slurry is by weight about 50 to 85 percent sulfuric acid, about 15 to 50 percent water and about 1 to 30 percent raw lunar soil,
   b. adding water to the slurry to dissolve the reacted minerals into an aqueous solution of metal sulfates and excess sulfuric acid,
   c. separating the aqueous solution from the unreacted minerals,
   d. electrolyzing under conditions which maximize oxygen production the aqueous solution to produce oxygen, with co-product metal, and a liquid stream including water and sulfuric acid, such conditions including a temperature of 25°-125° C. having 10 to 50 percent sulfuric acid to produce a pH of less than zero, and a concentration of metal sulfates of 0.1 to 10 percent,
   e. recycling the sulfuric acid from the liquid stream by feeding it to a vessel containing the slurry of lunar soils and hot sulfuric acid, and
   f. recovering and storing the oxygen for further use.

2. The process of claim 1 comprising also
cooling the aqueous solution after it is separated from the unreacted minerals and, prior to feeding it to the electrolyzer, to crystallize the ferrous sulfate.

3. The process of claim 1 comprising also
treating the unreacted minerals to produce anhydrous gangue, recyclable sulfuric acid, and recyclable water.

4. The process of claim 1 comprising also
feeding the liquid stream as a feed including water and sulfuric acid to a distillation device, and
distilling the liquid stream, producing water and sulfuric acid of higher concentration than that in the feed.

5. The process of claim 1 comprising also
recycling a liquid stream with unreacted ferrous sulfate, water, and sulfuric acid from the electrolyzing of the aqueous solution to the step of producing the slurry.

6. The process of claim 5 wherein
production of the slurry is done in a first digestion vessel,
the recycled liquid stream is passed through a heat exchanger to cool a stream from the first digestion vessel passing through the heat exchanger, and
the stream from the first digestion vessel is then fed to a second vessel in which water is added to the slurry.

7. The process of claim 6 wherein the recycled liquid stream from the electrolysis is fed to an aspirator to draw off gases from a heating of solids produced by clarifying the aqueous solution prior to introducing it to an electrolyzer.

8. A process for the production of oxygen on the moon from raw lunar soil containing metal oxide bearing minerals, the process comprising
   a. producing on the lunar surface an acidic slurry from the raw lunar soil in a first digestion vessel by reacting metal oxide bearing minerals in the raw lunar soil with hot sulfuric acid, wherein the slurry is by weight about 50 to 85 percent sulfuric acid, about 15 to 50 percent water and about 1 to 30 percent raw lunar soil,
   b. adding water to the slurry to dissolve the reacted minerals into an aqueous solution of metal sulfates and excess sulfuric acid,
   c. separating the aqueous solution from the remaining undissolved solids,
   d. electrolyzing under conditions which maximize oxygen production the aqueous solution producing oxygen with co-product metal, and a recycle stream containing unreacted minerals, water and sulfuric acid, such conditions including a temperature of 25°–125° C., having 10 to 50 percent sulfuric acid to produce a pH of less than zero, and a concentration of metal sulfates of 0.1 to 10 percent,
   e. feeding the recycle stream to the first digestion vessel, a second digestion vessel, or both,
   f. calcining the undissolved solids in a calcinator,
   g. recovering gases from the calcinator, and
   h. recovering and storing the oxygen for further use.

* * * * *